United States Patent Office 3,158,229
Patented Nov. 24, 1964

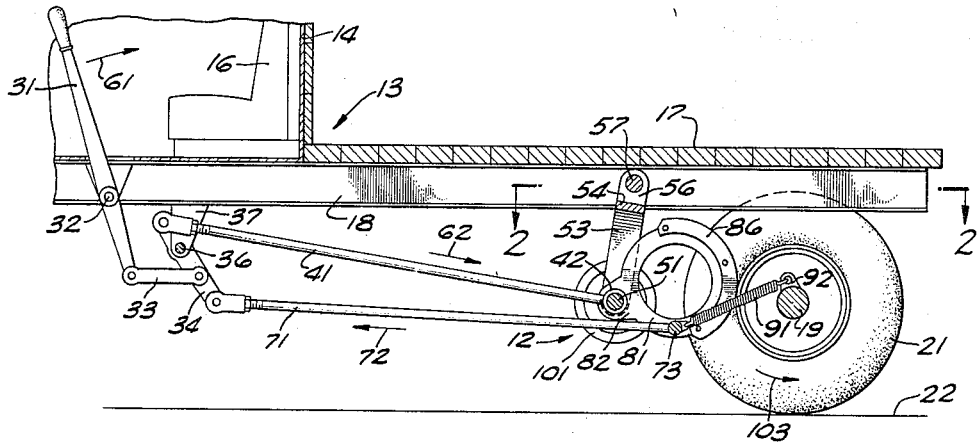
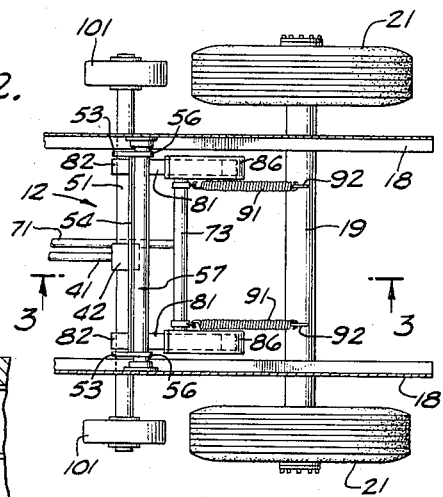

3,158,229
EMERGENCY BRAKING DEVICE
Aurelio Sancioni, Rte. 1, Box 277, Corning, Calif.
Filed Feb. 11, 1963, Ser. No. 257,464
2 Claims. (Cl. 188—4)

The invention relates to devices for braking motor vehicles in emergency situations where the vehicle's own brake system becomes inoperative.

It is an object of the invention to provide an emergency brake system which is independent of the vehicle's own brake system and which consequently, does not rely for its efficacy upon the availability of brake fluid or the cooperation of the vehicle's brake structure in any way.

It is another object of the invention to provide an emergency brake system which is positive in action and is therefore highly dependable in operation.

It is a further object of the invention to provide a vehicle brake system which can readily be installed either for use in connection with existing brake systems or as original factory equipment.

It is yet a further object of the invention to provide an emergency brake system which is relatively economical, yet which is durable and long-lived.

It is still another object of the invention to provide a brake system which is self-actuating in the sense that it is the movement of the vehicle itself that provides a substantial portion of the braking effort.

It is another object of the invention to provide a generally improved emergency braking system.

Other objects, together with the foregoing, are attained in the embodiment described in the following description and shown in the accompanying drawings, in which:

FIG. 1 is a fragmentary, vertical, longitudinal, sectional view of a truck vehicle having an emergency braking system installed thereon, the system elements being shown in base or retracted location;

FIG. 2 is a fragmentary section on the line 2—2 in FIG. 1; and FIG. 3 is a fragmentary section, on an enlarged scale, and with the elements shown in braking or projected position, the plane of the section being indicated by the line 3—3 in FIG. 2.

While the emergency braking system of the invention is susceptible of numerous physical embodiments, depending on the environment and requirements of use, substantial numbers of the herein shown and described embodiment have been made and tested and all have performed in an eminently satisfactory manner.

The device of the invention, generally designated by the reference numeral 12, is customarily installed on a truck vehicle 13, the truck having the usual cab 14, operator's seat 16, and truck bed 17 supported on the usual longitudinal frame or channel members 18. Completing the roster of relevant truck parts is the customary rear axle 19 and wheels 21, supported on the ground 22, or pavement.

It is especially to be noted at this juncture that while the emergency braking system of the invention is here described as being installed on a truck, the device is just as readily compatible with the structure of any trailer which might be drawn by a truck, or tractor. As will be explained hereinafter, in more detail, operation of the system can readily be effected by a variety of expedients including a handbrake 31, as shown in FIG. 1, a footbrake and with cables, rods or other linkages as may be deemed necessary to transmit the operator's braking movements to the wheels, whether the wheels be on the truck or on the trailer.

It is further to be recognized that the operative impulse can be transmitted to the wheels by pneumatic or hydraulic structure. It is felt, however, that operability of the system is preferably divorced from the pneumatic or hydraulic system of the vehicle since it is the faillure of these fluid systems that often produces the braking problem in the first instance. By keeping the emergency braking system of the invention in a separate realm, its dependability, it is believed, is greatly enhanced.

Adjacent the operator's position 16, the hand brake 31 is pivoted on a pin 32, the lower end of the brake 31 having pivotally mounted thereon a link 33, the link, in turn, being pivotally mounted on a lever 34 rockable about a pin 36 secured to a bracket 37 depending from the adjacent frame channel 18.

Pivotally mounted on the upper end of the lever 34 and extending rearwardly therefrom is a push rod 41, the after end of the push rod 41 terminating in a bushing 42 within which is journaled a transverse shaft 51. The shaft 51 is itself journaled in the lower end of a pair of arms 53 depending from the ends of a transverse bar 54, the bar 54, in turn, being rockably suspended by a pair of ears 56 rotatably mounted on a transverse pin 57 supported at its opposite ends by the channel members 18.

It can therefore be seen that as the operator pulls back on the upper portion of the brake handle 31, in the direction of the arrow 61, that the push rod 41 is urged rearwardly in the direction indicated by the arrow 62. The push rod 41, therefore, urges the shaft 51 rearwardly, the movement of the shaft 51 being an angular motion about the pin 57 as a pivot.

Concurrently, rearward movement of the crank handle causes a forward movement of a pull rod 71 pivotally mounted on the lower end of the lever 34. As the pull rod 71 moves forwardly in the direction indicated by the arrow 72, a cross-rod 73, to which the after end of the pull rod 71 is attached, is pulled forwardly. Forward movement of the cross-rod results in a clockwise swinging motion of a pair of rings 81 to which the ends of the cross-rod 73 are pivotally mounted.

Each of the rings includes an enlarged portion 82 (see FIG. 3) affixed to the transverse shaft 51 and being angularly movable therewith about the axis of the shaft 51.

Encompassing approximately one-half of the perimeter of the ring 81 and secured thereto, is a semi-circular shoe 86 of very tough material.

Urging the aftermost elements of the brake into a retracted, out of the way location is a pair of tension springs 91 each secured at one end to the cross-rod 73 and at the other end to a bracket 92 on the axle 19.

As is shown most clearly in FIGS. 1 and 3, the operator's rearward movement of the handle in the direction of the arrow 61 results in swinging the shaft 51 in a rearward direction.

A pair of wheels 101 (preferably rubber-covered) is rigidly mounted on the ends of the shaft 51 in registry with the leading peripheries of the vehicle's tires. Thus, as rearward movement of the brake lever continues, the rubber-covered wheels 101 are moved into contact with the tires of the truck vehicle whose forward motion is to be stopped, the truck wheels moving in the direction indicated by the arrow 103.

At the same time, as heretofore explained, movement of the brake handle swings the cross-rod 73 and the shoe-ring structure downwardly and forwardly into projected position against the urgency of the retracting spring 91.

As the rubber-covered wheels 101 commence to engage the rotating tires of the truck vehicle, the truck being in a run-away or uncontrollable condition, the friction between the vehicle tires and the rubber-covered wheels tends to cause the wheels 101, and thus the shaft 51, to rotate in a clockwise direction. This, in turn, tends to swing or revolve the rings and the wearing shoes 86 in a clockwise direction.

As soon as the wearing shoes reach the pavement 22, a frictional drag begins to take effect, tending to slow the vehicle. The more the brake handle is pulled, the more the rubber-covered wheel is urged against the vehicle's tire. This, in turn, creates a vastly multiplied (in force) movement of the drag shoe ring. The strength of the operator, in other words, is greatly augmented by the rotational movement of the vehicle's own tires.

In fact, with only a moderate degree of exertion, the operator can urge the braking structure against the rotating wheels of the runaway vehicle with sufficient force to effect an actual lifting of the vehicle's wheels from the pavement (as appears to a somewhat exaggerated extent in FIG. 3). In this situation, it is apparent that while tremendous wear of the shoes will occur, a positive stopping of the vehicle is achieved.

It has been found in practice that best results are obtained by first slowly urging the friction wheels 101 against the vehicle's tires interrupted by backing them off from time to time. The respective parts are so dimensioned that the wearing shoes 86 are brought into contact with the pavement somewhat prior to the engagement between the friction wheels 101 and the tires of the vehicle. With this procedure, the operator can exert a dragging effort which itself may be sufficient to bring the vehicle to a halt. If considerably more effort is required, a light touching of the wheels and tires will provide such effort. For ultimate effect, as explained above, the friction wheels 101 are urged against the tires with substantial force, the result being that the vehicle's wheels are lifted off the pavement and the wearing shoes absorb the entire weight.

It can therefore be seen that I have provided a device which does not rely on the vehicle's own brake system in any way, and which is extremely reliable in operation.

What is claimed is:

1. An emergency braking device for a wheeled vehicle comprising:
    (a) a spaced pair of arms each rockably mounted at one end on the vehicle frame forward of the vehicle's rear wheels for angular movement of said arms in a fore and aft direction;
    (b) a transverse shaft journalled on the other ends of said arms to partake of said angular movement thereof;
    (c) means connected to said shaft for selectively urging said shaft and said other ends of said arms in said fore and aft direction;
    (d) a spaced pair of rings each having an enlarged peripheral portion mounted on said shaft to partake of the motion thereof, said rings being swingable on said shaft between a first position removed from the ground and a second position in engagement with the ground;
    (e) resilient means for urging said rings in a direction toward said first position thereof;
    (f) means connected to the periphery of said rings for biasing said rings in a direction toward said second position thereof in opposition to said resilient means; and,
    (g) means for concurrently actuating said shaft urging means in an after direction and said ring biasing means in a direction toward said second position.

2. The device of claim 1 further characterized by a pair of frictional wheel members mounted on the ends of said shaft and in registry with the vehicle's rear wheels, said wheel members being movable into engagement with the tires of the vehicle's rear wheels for rotation thereby, the resultant rotational movement of said wheel members being transmitted to said shaft and said rings to effect movement of said rings toward said second position.

References Cited by the Examiner

UNITED STATES PATENTS

| | | | |
|---|---|---|---|
| 289,534 | 12/83 | Heyd. | |
| 1,108,685 | 8/14 | Boch | 188—4 |
| 2,818,139 | 12/57 | Sutter | 188—4 |
| 2,912,056 | 11/59 | Hamm | 180—15 |

ARTHUR L. LA POINT, *Primary Examiner.*